United States Patent
Matsumoto

(10) Patent No.: US 8,903,263 B2
(45) Date of Patent: Dec. 2, 2014

(54) SWITCHING POWER SUPPLY DEVICE USING SWITCHING REGULATOR

(75) Inventor: Shinichiro Matsumoto, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 13/008,805

(22) Filed: Jan. 18, 2011

(65) Prior Publication Data

US 2011/0194871 A1 Aug. 11, 2011

(30) Foreign Application Priority Data

Feb. 9, 2010 (JP) ................................. 2010-026997
Jan. 12, 2011 (JP) ................................. 2011-004367

(51) Int. Cl.
| | | |
|---|---|---|
| G03G 15/00 | (2006.01) | |
| H02M 3/335 | (2006.01) | |
| G05F 1/00 | (2006.01) | |
| H02M 3/156 | (2006.01) | |
| H02M 1/32 | (2007.01) | |

(52) U.S. Cl.
CPC ............. *G03G 15/80* (2013.01); *H02M 3/156* (2013.01); *G03G 15/5004* (2013.01); *H02M 1/32* (2013.01)
USPC ........... 399/88; 363/21.1; 363/21.17; 363/26; 323/282; 323/284

(58) Field of Classification Search
CPC ..... G03G 15/80; H02M 3/3376; H02M 3/156
USPC ............ 399/37, 88; 323/282, 284; 363/21.17, 363/26
See application file for complete search history.

(56) References Cited

U.S. PATENT DOCUMENTS

| | | | | |
|---|---|---|---|---|
| 4,035,710 | A | * | 7/1977 | Joyce ............................... 363/37 |
| 4,868,729 | A | * | 9/1989 | Suzuki ........................ 363/21.15 |
| 5,227,964 | A | * | 7/1993 | Furuhata ...................... 363/56.1 |
| 5,406,468 | A | * | 4/1995 | Booth ............................. 363/15 |
| 5,479,329 | A | * | 12/1995 | Motonobu et al. .............. 363/15 |
| 5,808,455 | A | | 9/1998 | Schwartz et al. |
| 6,987,936 | B2 | * | 1/2006 | Satoh et al. ..................... 399/88 |
| 7,355,864 | B2 | | 4/2008 | Matsumoto |
| 2003/0035307 | A1 | * | 2/2003 | Matsuura et al. ............... 363/25 |
| 2004/0201937 | A1 | * | 10/2004 | Yoshida ....................... 361/93.7 |
| 2004/0212347 | A1 | * | 10/2004 | Fogg .............................. 320/127 |
| 2005/0110474 | A1 | * | 5/2005 | Ortiz et al. .................... 323/282 |
| 2005/0135036 | A1 | * | 6/2005 | Kanamori et al. ........... 361/93.1 |
| 2007/0059016 | A1 | * | 3/2007 | Sato et al. ....................... 399/88 |

(Continued)

FOREIGN PATENT DOCUMENTS

| | | |
|---|---|---|
| JP | 62-77824 | 4/1987 |
| JP | 05236642 A | 9/1993 |
| JP | 0716593 U | 3/1995 |
| JP | 09149633 A | 6/1997 |
| JP | 11-146637 | 5/1999 |
| JP | 2000-023355 | 1/2000 |

(Continued)

*Primary Examiner* — David Gray
*Assistant Examiner* — Tyler Hardman
(74) *Attorney, Agent, or Firm* — Fitzpatrick, Cella, Harper & Scinto

(57) ABSTRACT

A power supply device includes, for example, a switching element, a rectifying circuit having a first rectifying element, and a control circuit which controls an output of the rectifying circuit. In particular, the power supply device includes a detection unit which detects a current flowing through the first rectifying element, and an output reduction unit which reduces the output of the rectifying circuit as an output of the switching power supply device. The output reduction unit changes a switching state of the switching element when the detection result of the detection unit exceeds a predetermined value.

12 Claims, 15 Drawing Sheets

(56) References Cited

U.S. PATENT DOCUMENTS

| | | | |
|---|---|---|---|
| 2007/0103944 A1* | 5/2007 | Mori | 363/21.12 |
| 2007/0268006 A1* | 11/2007 | Devey | 323/222 |
| 2008/0001589 A1* | 1/2008 | Shiroyama | 323/282 |
| 2008/0037295 A1* | 2/2008 | Suzuki et al. | 363/40 |
| 2008/0111531 A1* | 5/2008 | Hasegawa et al. | 323/284 |

FOREIGN PATENT DOCUMENTS

| | | | |
|---|---|---|---|
| JP | 2004-266984 A | | 9/2004 |
| JP | 2006-067703 A | | 3/2006 |
| JP | 2006136146 A | | 5/2006 |
| JP | 2009-089451 | | 4/2009 |
| JP | 2009089451 A | * | 4/2009 |

* cited by examiner

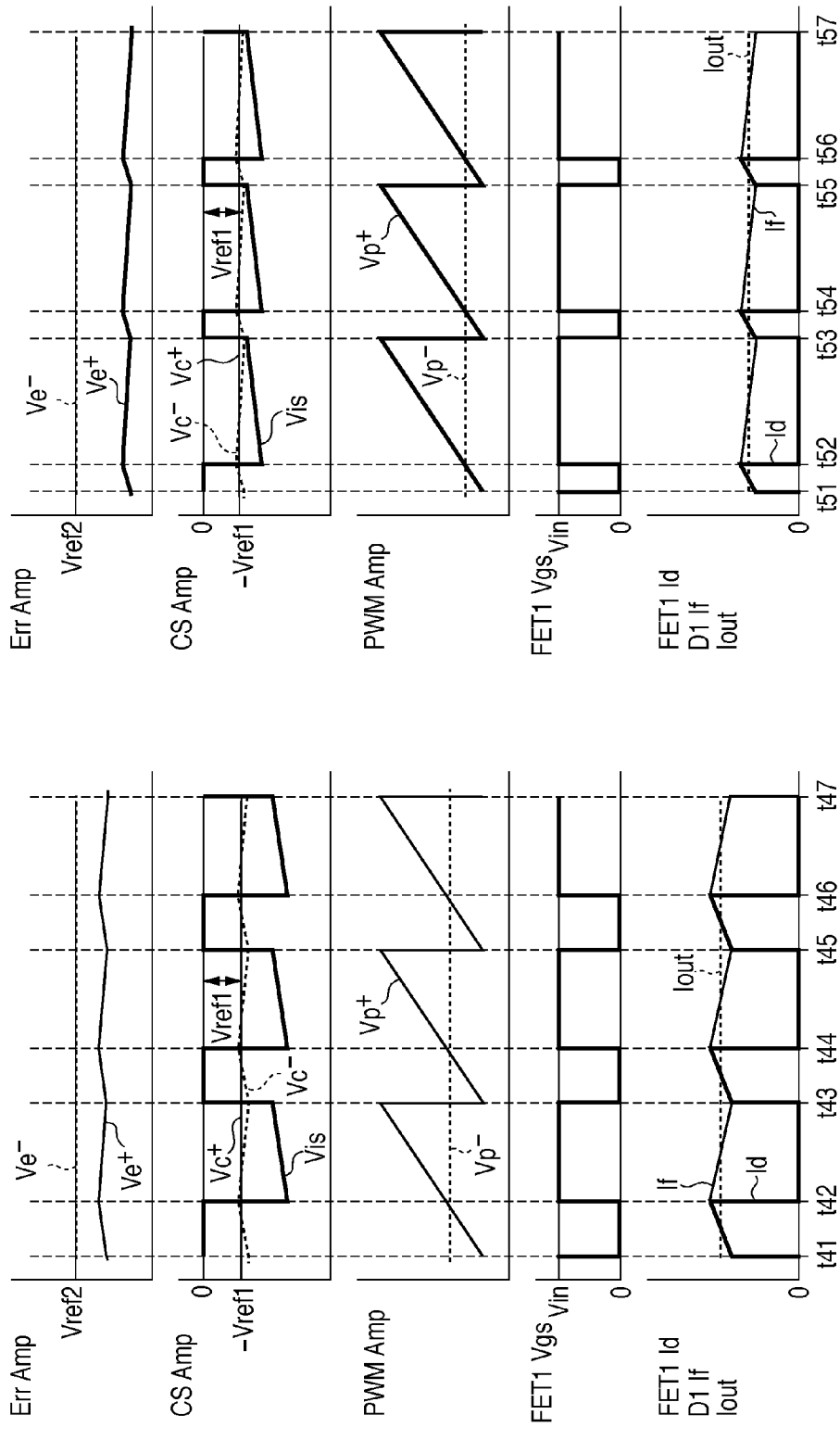

US 8,903,263 B2

SWITCHING POWER SUPPLY DEVICE USING SWITCHING REGULATOR

BACKGROUND OF THE INVENTION

1. Field of the Invention

The present invention relates to a switching power supply device including a switching regulator such as a DC/DC converter.

2. Description of the Related Art

A switching power supply device including a switching regulator such as a DC/DC converter has prevailed as a power supply device for, for example, an image forming apparatus. In such a power supply device, a large-capacity capacitor is required to attain slow voltage and current changes with respect to load variations. Japanese Patent Laid-Open No. 2000-023355 has proposed means for suppressing output voltage variations based on a notice signal that gives notice of an abrupt change in the impedance of a load.

A switching regulator generally includes an overload protection circuit. However, depending on the arrangement of the overload protection circuit, the characteristics (drooping characteristics) of an output voltage with respect to an output current of the switching regulator unwantedly change to [\(backslash)] type characteristics. According to FIG. 4A, when an output current Iout exceeds Ia as a drooping start point, an output voltage Vout begins to droop. When the output current Iout reaches Ib as a load short point, the output voltage Vout becomes zero. In a switching power supply device having such [\(backslash)] type drooping characteristics, for example, when short-circuiting of a load has occurred, a current having a large peak value unwantedly flows through a switching element and rectifying element. This results in low reliability and depletion of the switching element and rectifying element.

SUMMARY OF THE INVENTION

Hence, the present invention solves at least one of such problems and other problems. For example, the present invention provides an overload protection circuit which can maintain the reliability of elements such as a switching element and rectifying element used in a switching power supply circuit even when, for example, short-circuiting of a load has occurred. Note that other problems will be understood through the specification.

A power supply device includes, for example, a switching element, a rectifying circuit having a first rectifying element, and a control circuit used to control an output of the rectifying circuit. The control circuit is a circuit for controlling the output of the rectifying circuit by changing a switching state of the switching element according to the output of the rectifying circuit and a predetermined target value. Especially, the power supply device includes a detection unit which detects a current flowing through the first rectifying element, and an output reduction unit which reduces the output of the rectifying circuit as an output of the switching power supply device. The output reduction unit changes the switching state of the switching element when the detection result of the detection unit exceeds a predetermined value.

According to the present invention, when a current, which flows through the first rectifying element included in the rectifying circuit, exceeds a predetermined value, which is determined in advance to discriminate if an output voltage of the rectifying circuit begins to droop, the output of the switching power supply device is reduced. Thus, since the drooping characteristics at the time of an overload become [/(slash)] type characteristics, even when, for example, short-circuiting of a load occurs, the reliability of elements such as a switching element and rectifying element used in the switching power supply device can be maintained.

Further features of the present invention will become apparent from the following description of exemplary embodiments (with reference to the attached drawings).

BRIEF DESCRIPTION OF THE DRAWINGS

FIGS. 7A and 7B are charts showing the operation of the DC/DC converter an the output current Iout assumes an excessive value (overload state);

DESCRIPTION OF THE EMBODIMENTS

[Basic Arrangement]

Figure 1:
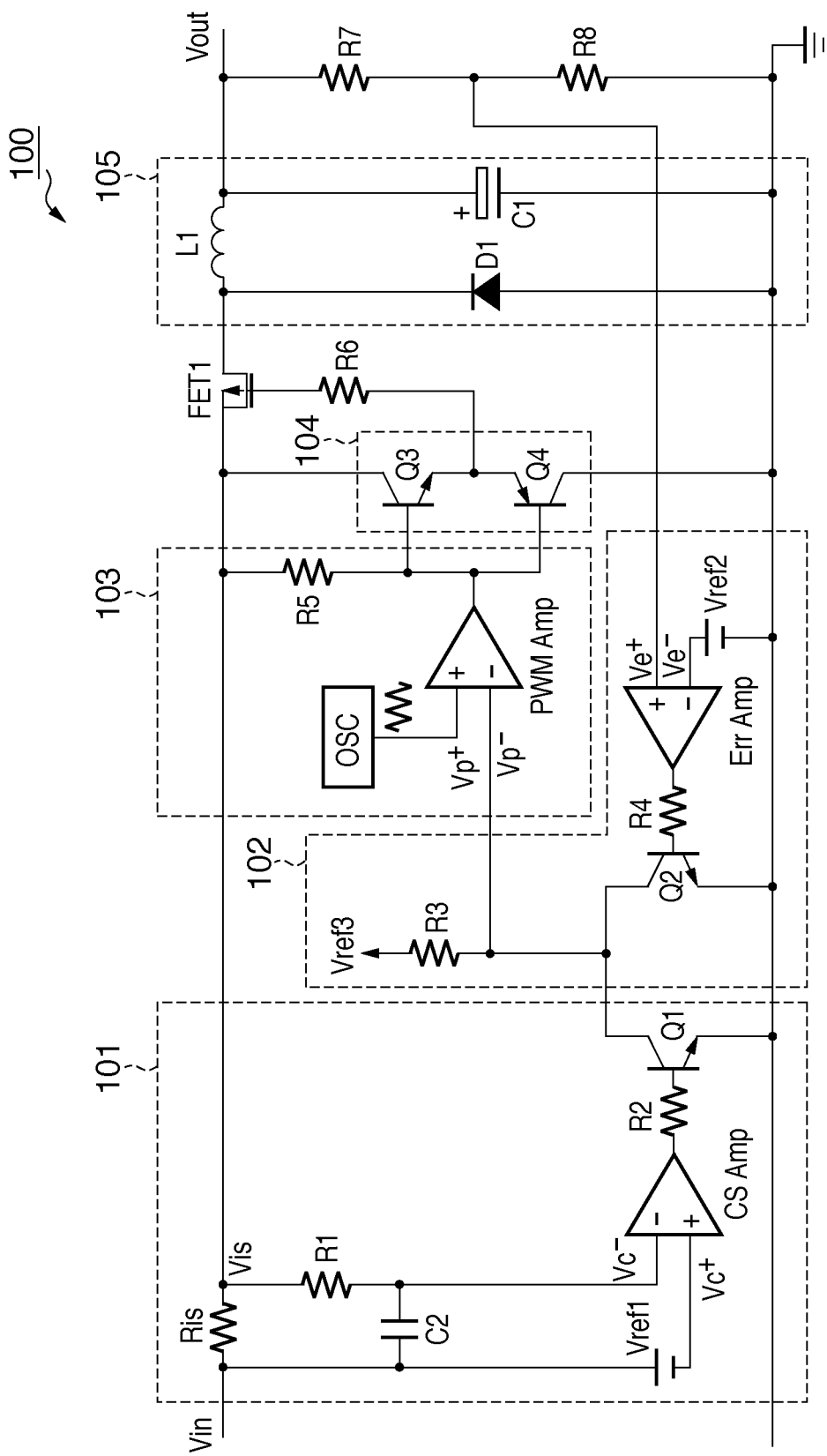
FIG. 1 is a circuit diagram showing an example of a DC/DC converter as a basis.
Figure 2:
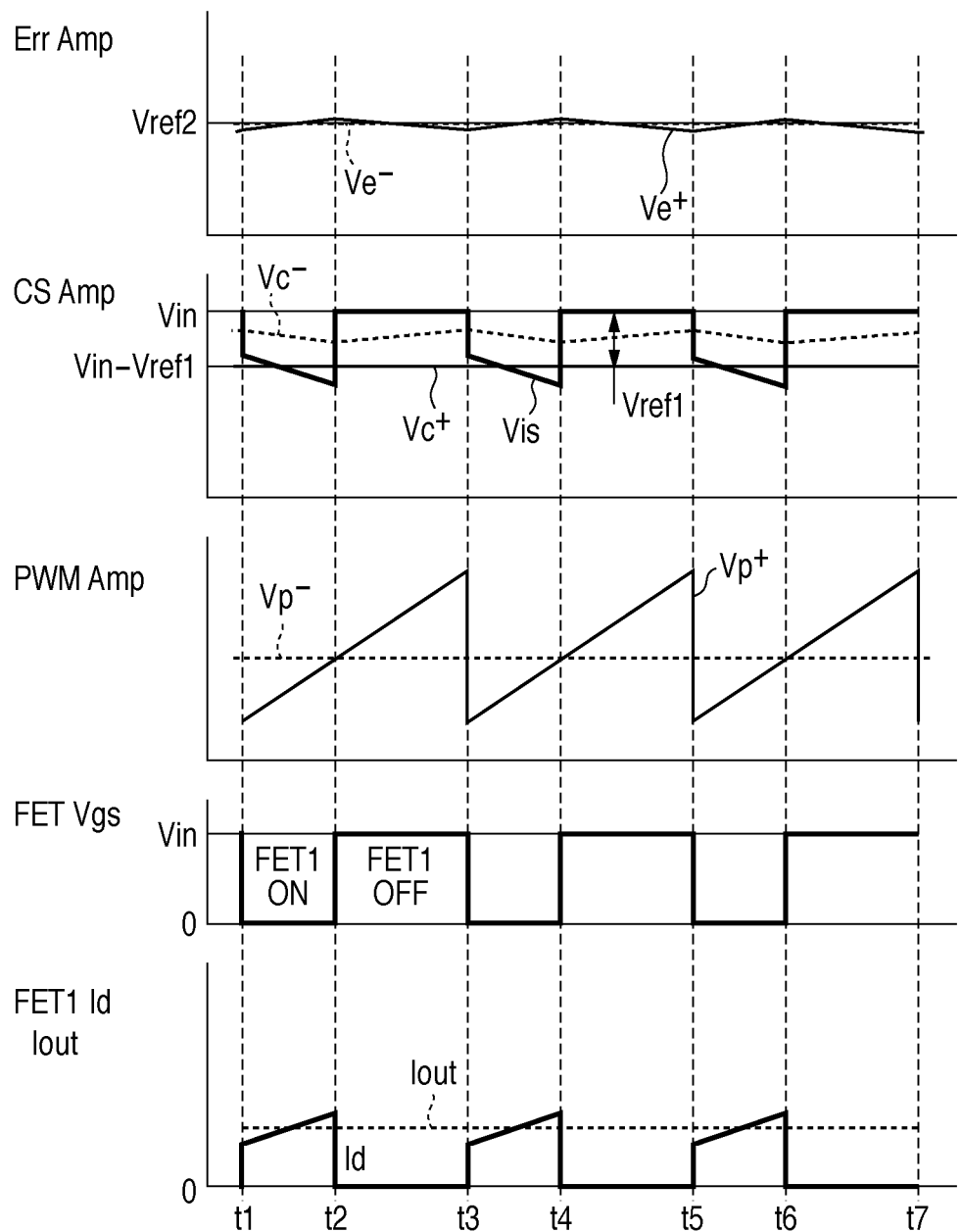
FIG. 2 is a chart showing a basic operation example of the DC/DC converter.

FIG. 1 is a circuit diagram showing an example of a DC/DC converter as a basis of the present invention. FIG. 2 is a chart showing a basic operation example of the DC/DC converter. Principal components of a DC/DC converter 100 are an overload protection circuit 101, error amplifier 102, PWM circuit 103, push-pull circuit 104, FET1 as a switching element, and a rectifying circuit 105. The rectifying circuit 105 includes an inductor and first rectifying element and is used to rectify an output of the switching element. An input voltage Vin is supplied to the FET1 via a resistor Ris. To the gate terminal of the FET1, the push-pull circuit 104 including transistors Q3 and Q4 is connected via a resistor R6. The push-pull circuit 104 performs a push-pull operation according to a pulse-width modulation signal from the pulse-width modulation circuit. To the push-pull circuit 104, the PWM circuit 103 including a resistor R5, comparator PWM Amp, and triangular wave generator OSC is connected. The PWM circuit 103 outputs a pulse-width modulation signal for changing an ON duty of the switching element according to an output from the error amplifier 102. To an inverting input terminal Vp− of the comparator PWM Amp, the error amplifier 102 including resistors R3 and R4, a transistor Q2, comparator Err Amp, and constant-voltage power supply Vref2 is connected. The error amplifier 102 functions as a part of a control circuit which changes the switching state of the switching element according to the output from the rectifying circuit and a predetermined target value so as to control and/or stabilize the output of the rectifying circuit. Note that the control circuit includes the error amplifier 102, PWM circuit 103, and push-pull circuit.

When the FET1 performs switching, a pulse voltage is supplied from the FET1 to an inductor L1 and a diode D1 as a rectifying element. This pulse voltage is rectified to a DC output voltage Vout by the inductor L1, the diode D1, and an electrolytic capacitor C1. The output voltage Vout is voltage-divided by a voltage dividing circuit configured by resistors R7 and R8, and is supplied to a non-inverting input terminal Ve+ of the comparator Err Amp. On the other hand, a reference voltage Vref2 is supplied to an inverting input terminal Ve− of the comparator Err Amp. Therefore, the comparator Err Amp increases/decreases a base current of the transistor Q2 based on error information of the output voltage Vout, and controls the inverting input terminal voltage Vp− of the comparator PWM Amp. Thus, the FET1 performs PWM switching based on the error information of the output voltage Vout, so that the output voltage Vout is converted into a constant voltage.

A switching regulator generally includes an overload protection circuit. The DC/DC converter 100 shown in FIG. 1 also includes the overload protection circuit 101. The overload protection circuit 101 is configured by resistors Ris, R1, and R2, a capacitor C2, constant-voltage power supply Vref1, comparator CS Amp, and transistor Q1. The resistor Ris converts a drain current Id of the FET1 into a voltage Vis. The voltage Vis is averaged by a filter circuit including the resistor R1 and capacitor C2, and is supplied to an inverting input terminal Vc− of the comparator CS Amp. On the other hand, a difference voltage Vin−Vref1 between the input voltage and a voltage from the constant-voltage power supply Vref1 is supplied to a non-inverting input terminal Vc+ of the comparator CS Amp. FIG. 2 shows the relationship among voltages of the comparators Err Amp, CS Amp, and PWM Amp, a gate-source voltage Vgs of the FET1, the drain current Id of the FET1, and an output current Iout along a time axis. When the output current Iout assumes a normal value, the inverting input terminal voltage Vc− and non-inverting input terminal voltage Vc+ of the comparator CS Amp meet Vc−>Vc+. Under this condition, the comparator CS Amp disables the transistor Q1. Therefore, the comparator CS Amp does not intervene in any operation of the PWM circuit 103.

Figure 3A:
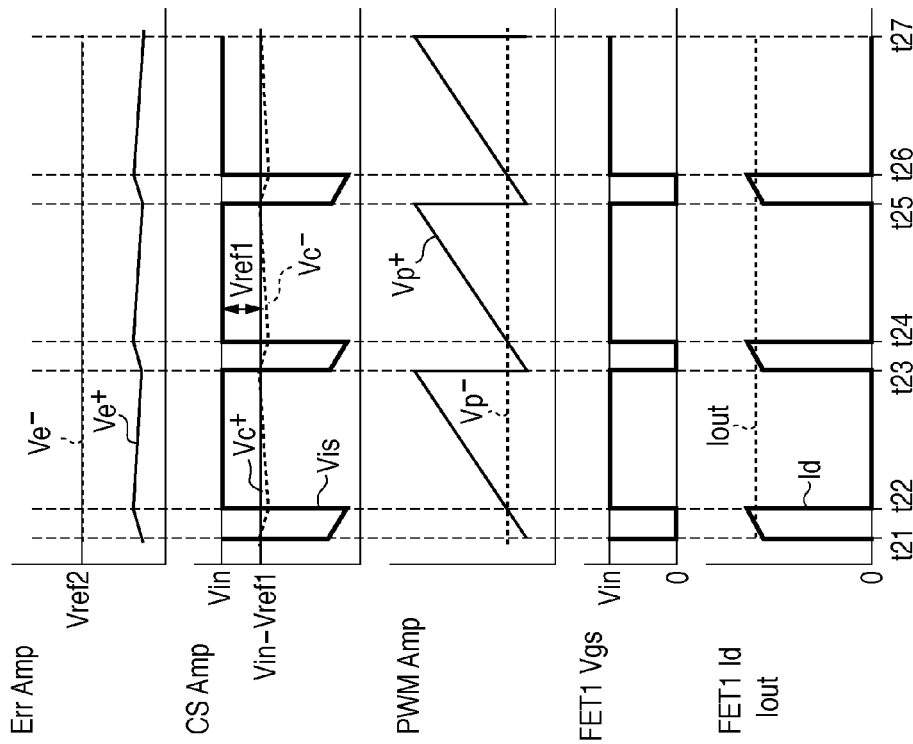
FIGS. 3A and 3B are charts showing the operation of the DC/DC converter when an output current Iout assumes an excessive value (overload state)
Figure 3B:
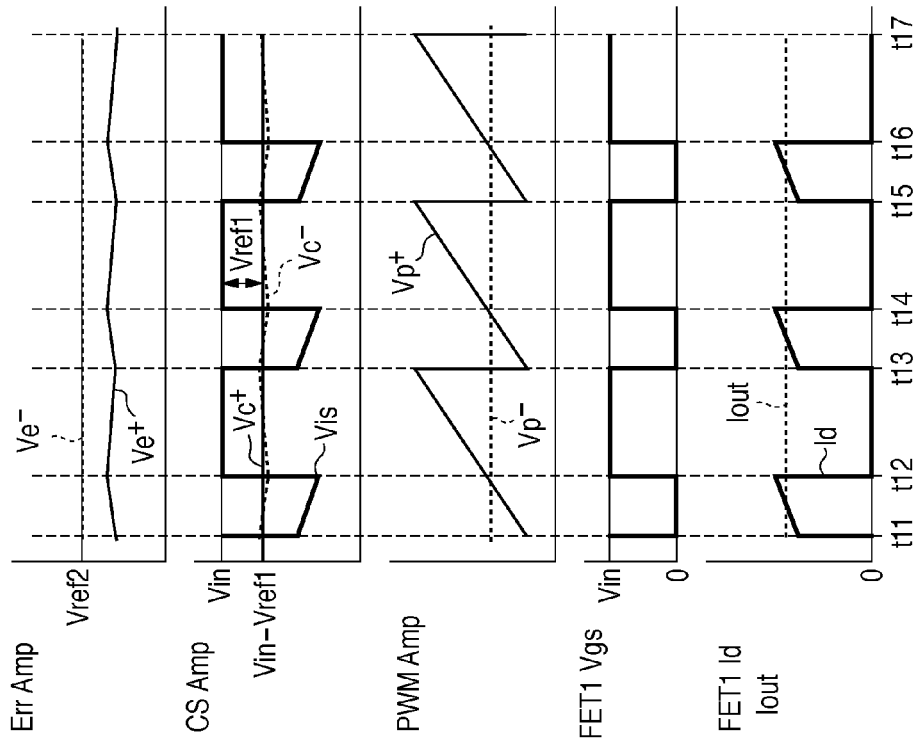

FIGS. 3A and 3B show the relationship among the voltages of the comparators Err Amp, CS Amp, and PWM Amp, the gate-source voltage Vgs of the FET1, the drain current Id of the FET1, and the output current Iout when the output current Iout assumes an excessive value. Shortly, FIGS. 3A and 3B are charts showing the operation when the output current Iout increases (overload state). When this is the case, the peak value of the drain current Id rises. Hence, the amplitude of Vis increases. In this case, the inverting input terminal voltage Vc− of the comparator CS Amp becomes slightly lower than the non-inverting input terminal voltage Vc+ (=Vin−Vref1). Then, the comparator CS Amp increases the base current of the transistor Q1 to reduce the inverting input terminal voltage Vp− of the comparator PWM Amp. As a result, since the ON duty (duty ratio) of the FET1 is reduced, the pulse width of Vis decreases, and the inverting input terminal voltage Vc− of the comparator CS Amp rises. Under the aforementioned closed loop control, the FET1 performs PWM switching, so that the inverting input terminal voltage Vc− and the non-inverting input terminal voltage Vc+ (=Vin−Vref1) of the comparator CS Amp become nearly equal to each other. Note that when the ON duty of the FET1 is reduced, the output voltage Vout is also reduced.

As FIGS. 3A and 3B are showing, when the output current Iout further increases, the comparator CS Amp further increases the base current of the transistor Q1. In response to this, the comparator PWM Amp further reduces the ON duty of the FET1. Hence, the output voltage Vout is further reduced.

Figure 4A:
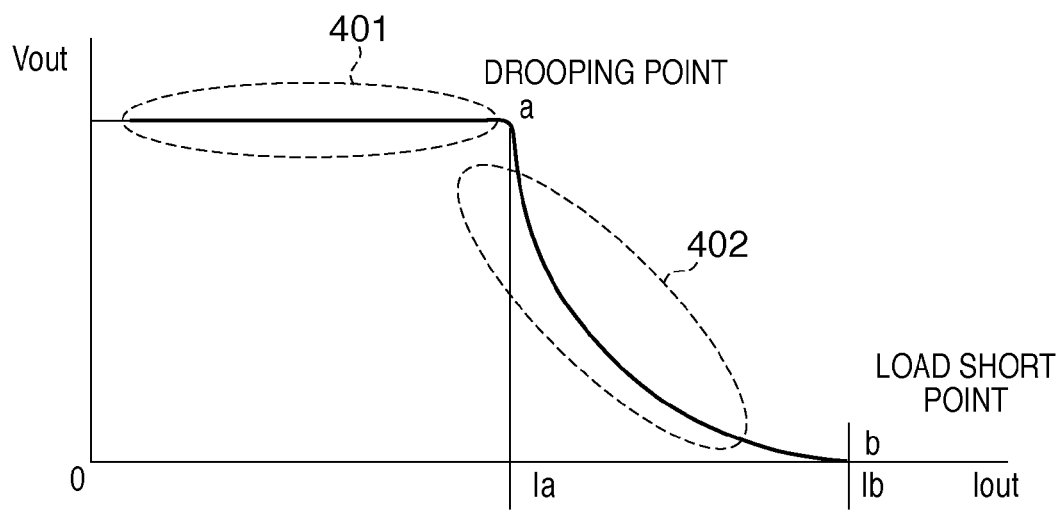
FIG. 4A is a graph for explaining the relationship between an output voltage Vout and output current Iout (drooping characteristics)

FIG. 4A shows the relationship between the output voltage Vout and output current Iout (drooping characteristics). In a control region 401 by the comparator Err Amp described using FIG. 2, the output voltage Vout becomes a nearly constant voltage Va irrespective of the output current Iout. The voltage Va is expressed by:

$$V_a \cong \frac{R_7 + R_8}{R_8} \cdot V_{ref2} \quad (1)$$

When the output current Iout rises and reaches a drooping start current Ia, the output voltage Vout begins to droop. After that, the control enters a control region 402 by the comparator CS Amp described using FIGS. 3A and 3B. The voltage Vis detected by the resistor Ris is averaged by the filter circuit including the resistor R1 and capacitor C2, and is supplied to the inverting input terminal Vc− of the comparator CS Amp. The inverting input terminal voltage Vc− and non-inverting input terminal voltage Vc+ of the comparator CS Amp are controlled to be roughly equal to each other. Hence, letting ton be the ON time of the FET1, and Tsw be the switching period, Vref1, Ris, and Ia satisfy:

$$V_{ref1} \cong R_{is} \cdot I_a \cdot \frac{t_{on}}{T_{sw}} \quad (2)$$

Figure 4B:
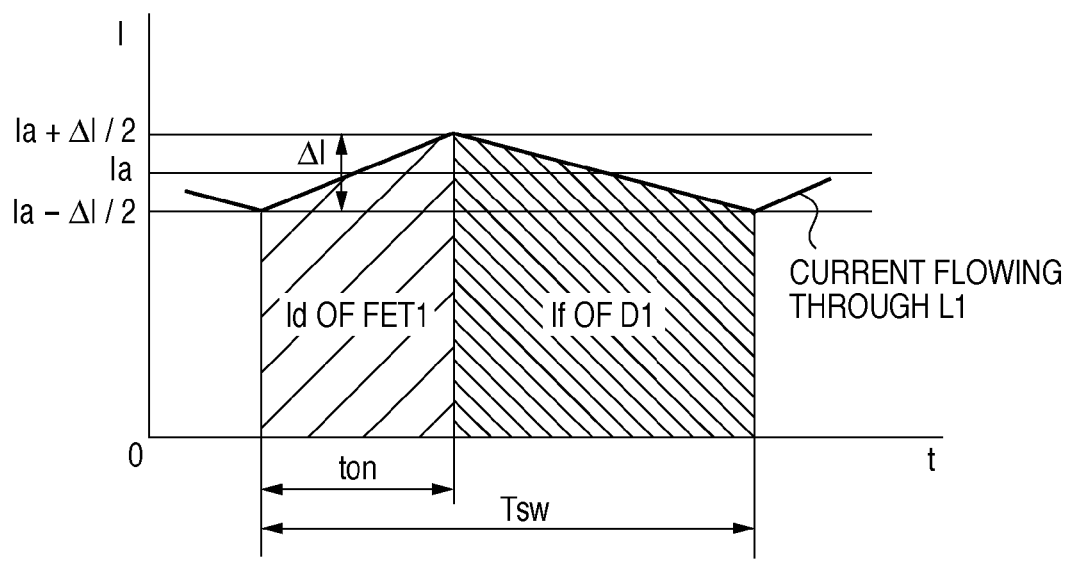
FIG. 4B is a graph for explaining a change in current flowing through an inductor L1 as time elapses.

As shown in FIG. 4B, letting ΔI be the change amount of the drain current Id of the FET1, L1 be the inductance of the inductor L1, and Vfd1 be the forward voltage drop across the diode D1, we have:

$$V_{in} - V_a \cong L_1 \cdot \frac{\Delta I}{t_{on}} \quad (3)$$

$$V_a + V_{fd1} \cong L_1 \cdot \frac{\Delta I}{T_{sw} - t_{on}} \quad (4)$$

From expressions (2), (3), and (4) above, the drooping start current Ia is given by:

$$I_a \cong \frac{V_{ref1}}{R_{is}} \cdot \frac{V_{in} - V_{fd1}}{V_a + V_{fd1}} \quad (5)$$

An output current Ib when the output voltage Vout droops and finally reaches zero is calculated from expression (5) above.

In expression (5), when Va is asymptotically decreased to zero, we have:

$$I_b \cong \lim_{V_a \to 0} I_a \cong \lim_{V_a \to 0} \left( \frac{V_{ref1}}{R_{is}} \cdot \frac{V_{in} - V_{fd1}}{V_a + V_{fd1}} \right) \cong \frac{V_{ref1}}{R_{is}} \cdot \frac{V_{in} - V_{fd1}}{V_{fd1}} \quad (6)$$

At this time, assuming that Vin>Vfd1, we have:

$$V_{in} > V_{fd1} \Rightarrow \frac{V_{ref1}}{R_{is}} \cdot \frac{V_{in} - V_{fd1}}{V_a + V_{fd1}} < \frac{V_{ref1}}{R_{is}} \cdot \frac{V_{in} - V_{fd1}}{V_{fd1}} \quad (7)$$

Hence, the drooping start current Ia and the output current Ib when the output voltage Vout reaches zero meet:

$$I_a < I_b \quad (8)$$

As can be seen from inequality (8), the drooping characteristics of the output voltage Vout become [\(backslash)] type characteristics, as shown in FIG. 4A. When the drooping characteristics of the output voltage Vout become [\(backslash)] type characteristics, a current having a large peak value flows through the FET1 and diode D1 when, for example, short-circuiting of a load occurs. That is, the reliability of these devices is reduced or these devices are depleted.

[First Embodiment]

Figure 5:
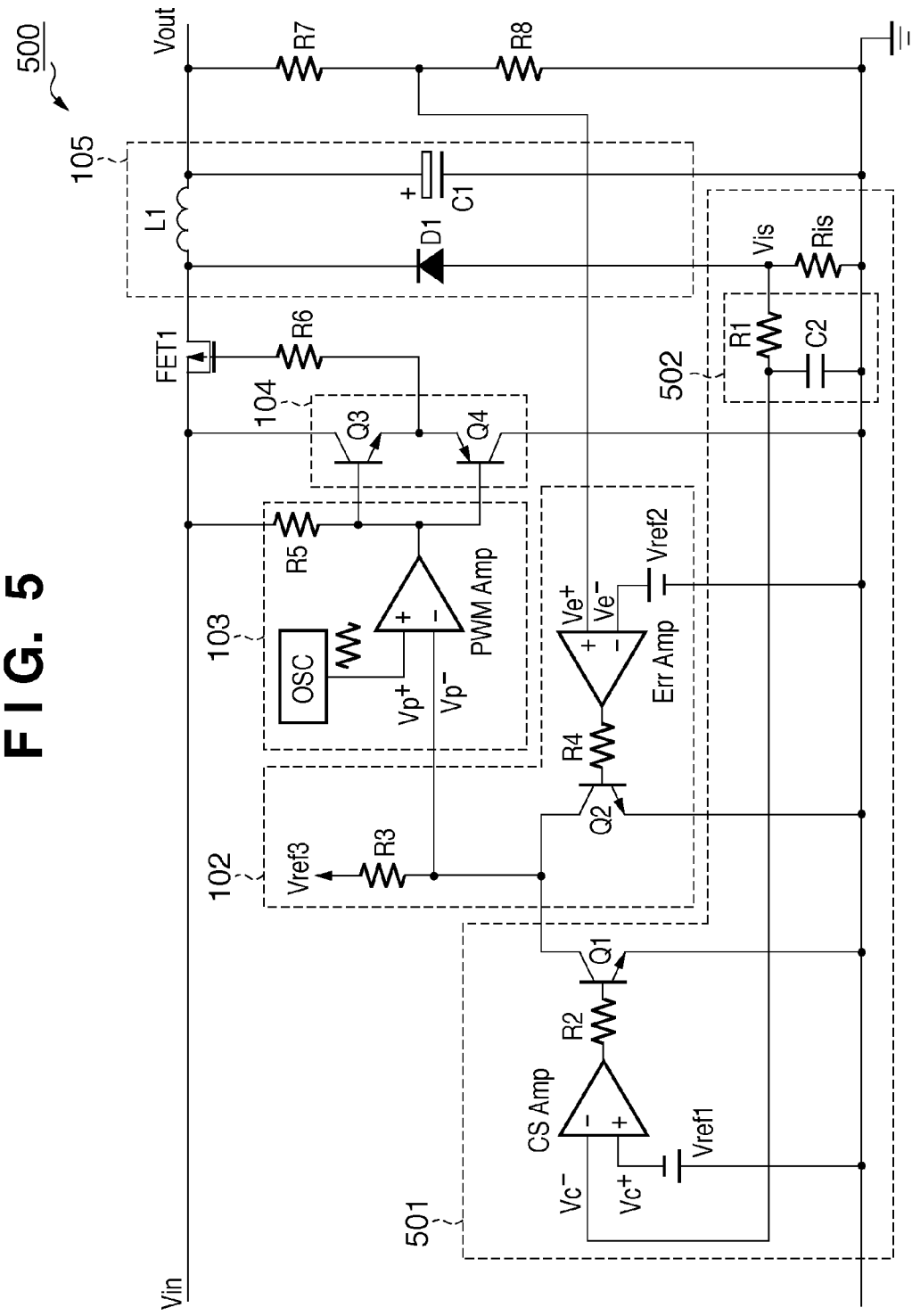
FIG. 5 is a circuit diagram showing a DC/DC converter according to the first embodiment.

FIG. 5 is a circuit diagram showing a DC/DC converter according to the first embodiment of the present invention. This embodiment will explain a DC/DC converter 500 as an example of a switching power supply device. A characteristic feature of the first embodiment lies in that overload protection is performed by detecting a current flowing through a diode D1 as a rectifying element for a circulate current in the DC/DC converter 500 by an overload protection circuit 501. As for items which are common to those described using FIGS. 1 to 4B, the following description will be simplified by denoting them by the same reference numerals.

Referring to FIG. 5, to a first terminal of an FET1 as a switching element, a first terminal of an inductor L1 and that of a diode D1 as a first rectifying element are connected. To a second terminal of the inductor L1, a first output terminal used to connect a load, and a first terminal of a capacitor C1 are connected. To a second terminal of the diode D1 as the first rectifying element, a first terminal of a detection resistor Ris which serves as a detection unit is connected. To a second terminal of the detection resistor Ris, a second terminal of the capacitor C1 and a second terminal used to connect a load are connected.

Figure 6:
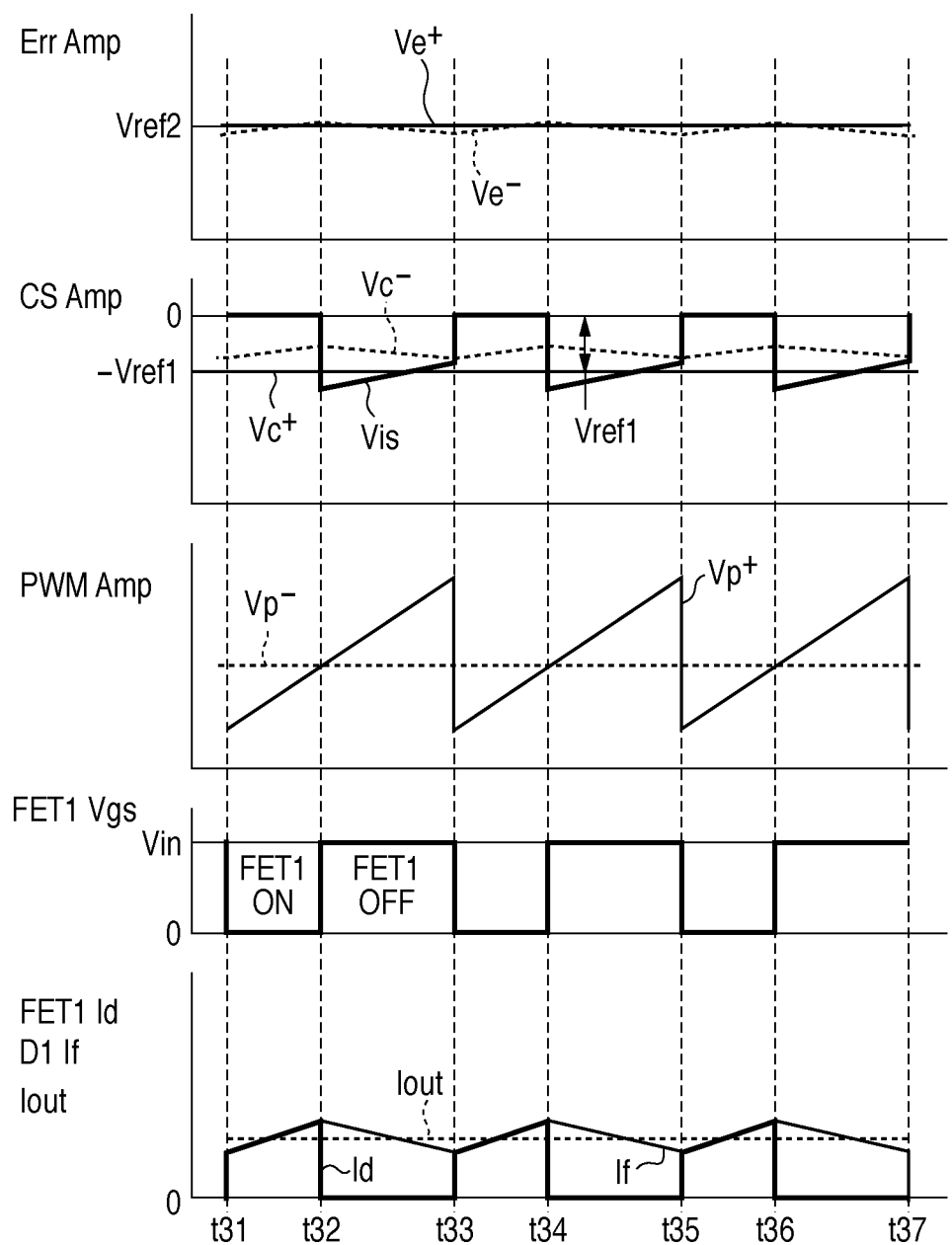
FIG. 6 is a chart showing an operation example when an output current Iout assumes a normal value.

As can be seen from comparison between FIGS. 1 and 5, the overload protection circuit 101 is replaced by the overload protection circuit 501. By adopting this overload protection circuit 501, the [\(backslash)] type drooping characteristics can be changed to [/(slash)] type drooping characteristics. That is, the reliability of devices such as the FET1 and diode D1 can be maintained, and depletion due to an overload can be suppressed. FIG. 6 is a chart showing the operation when an output current Iout assumes a normal value. An input voltage Vin of the DC/DC converter 500 is supplied to the FET1. As can be seen from comparison with FIG. 2, only the operation of a comparator CS Amp is different due to a different arrangement of the overload protection circuit.

The operation of the overload protection circuit 501 will be described below. The overload protection circuit 501 serves as an output reduction unit which reduces an output of a rectifying circuit as an output of the switching power supply device by changing a switching state of the switching element when the detection result of the detection unit exceeds a predetermined value. The overload protection circuit 501 is configured by resistors Ris, R1, and R2, a capacitor C2, constant-voltage power supply Vref1, comparator CS Amp, and transistor Q1. The resistor Ris server serves as a detection unit which detects a current flowing through the first rectifying element, and converts a forward current If of the diode D1 into a voltage Vis. That is, the resistor Ris configures a detection circuit of the forward current If. The voltage Vis is averaged by a filter circuit 502 including the resistor R1 and capacitor C2, and is supplied to an inverting input terminal Vc− of the comparator CS Amp. The filter circuit 502 serves as an averaging unit which averages the detection result of the detection unit. That is, the filter circuit 502 includes the resistor R1 used as an averaging resistor, and the capacitor C2 used as an averaging capacitor. To a first terminal of the resistor R1, the second terminal of the diode D1 and a first terminal of the resistor Ris are connected. To a first terminal of the capacitor C2, a second terminal of the resistor R1 is connected. To the second terminal of the capacitor C2, a second terminal of the resistor Ris is connected. On the other hand, to a non-inverting input terminal Vc+ of the comparator CS Amp, a voltage −Vref1 is supplied. As shown in FIG. 6, when the output current Iout assumes a normal value, the inverting input terminal voltage Vc− and non-inverting input terminal Vc+ of the comparator CS Amp meet Vc−>Vc+. Hence, the comparator CS Amp disables the transistor Q1. Therefore, the comparator CS Amp does not intervene in the operation of a PWM circuit. In this way, the overload protection circuit 501 does not intervene in the control of a control circuit before the output of the averaging unit indicates that the output of the switching power supply device begins to droop.

On the other hand, as shown in FIGS. 7A and 7B, when the output current Iout assumes an excessive value, the peak value of the forward current If rises. Hence, the amplitude of Vis increases. Then, the inverting input terminal voltage Vc− of the comparator CS Amp is slightly lower than the non-inverting input terminal voltage Vc+ (=−Vref1). In this state, the comparator CS Amp increases the base current of the transistor Q1, and reduces an inverting input terminal voltage Vp− of a comparator PWM Amp. As a result, the ON duty of the FET1 is reduced. The output voltage Vout is reduced due to the reduction of the ON duty of the FET1.

When the ON duty of the FET1 is reduced, the conduction duty of the diode D1 increases conversely. Hence, the pulse width of Vis also increases. The increased pulse width of Vis further reduces the inverting input terminal voltage Vc− of the comparator CS Amp. Then, as shown in FIG. 7B, the comparator CS Amp further increases the base current of the transistor Q1, and reduces the inverting input terminal voltage Vp− of the comparator PWM Amp. In response to this, the comparator PWM Amp further reduces the ON duty of the FET1. That is, the control enters the following positive feedback loop:

[reduction of ON duty of FET1→increase in conduction duty of D1→reduction of inverting input terminal voltage Vc− of CS Amp→reduction of ON duty of FET1→ . . . ]

In this way, the overload protection circuit 501 reduces the output of the rectifying circuit by intervening in the control of the control circuit when the output of the averaging unit indicates that the output of the switching power supply device begins to droop.

Figure 8A:
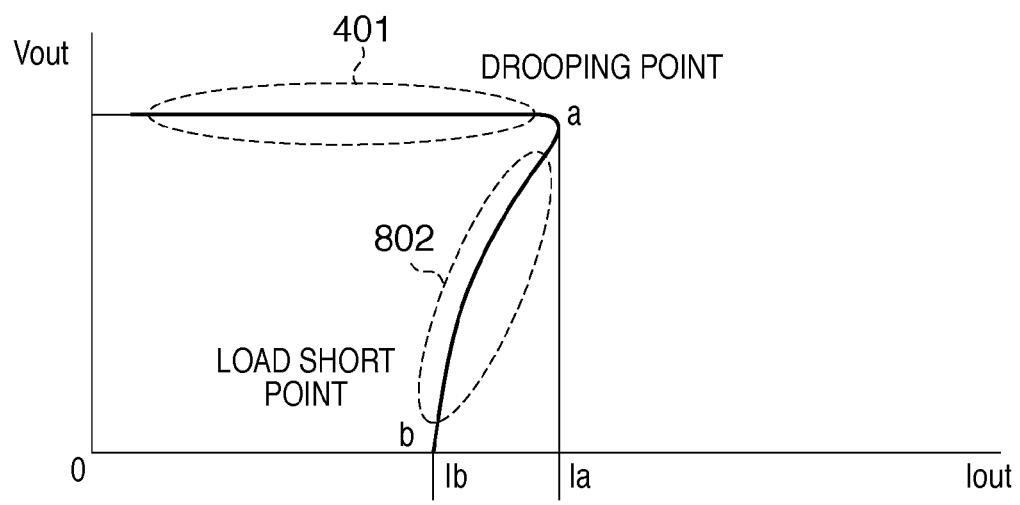
FIG. 8A is a graph for explaining the relationship between an output voltage Vout and output current Iout.

FIG. 8A shows the relationship between the output voltage Vout and output current Iout in the aforementioned positive feedback loop. As has been described above, in a control region 401 by a comparator Err Amp, the output voltage Vout becomes a nearly constant voltage Va irrespective of the output current Iout. Va is as described above using expression (1). When the output current Iout rises and reaches a drooping start current Ia, the output voltage Vout begins to droop. After that, the control enters a control region 802 by the comparator CS Amp. The voltage Vis detected by the resistor Ris is averaged by the filter circuit 502, and is supplied to the inverting input terminal Vc− of the comparator CS Amp. The inverting input terminal voltage Vc− and non-inverting input terminal voltage Vc+ of the comparator CS Amp are controlled to be roughly equal to each other. Letting toff be the conduction time of the diode D1, and Tsw be the switching period, Vref1, Ris, and Ia satisfy:

$$V_{ref1} \cong R_{is} \cdot I_a \cdot \frac{t_{off}}{T_{sw}} \quad (9)$$

Figure 8B:
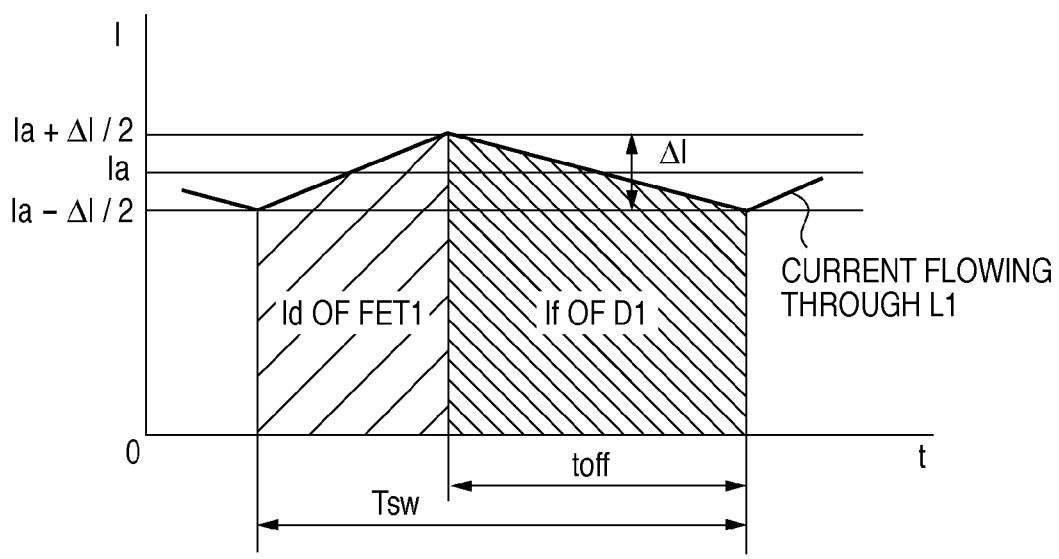
FIG. 8B is a graph for explaining a change in current flowing through an inductor L1 as time elapses.

As shown in FIG. 8B, letting ΔI be the change amount of the forward current If of the diode D1, L1 be the inductance of the inductor L1, and Vfd1 be the forward voltage drop across the diode D1, we have:

$$V_{in} - V_a \cong L_1 \cdot \frac{\Delta I}{T_{sw} - t_{off}} \quad (10)$$

$$V_a - V_{fd1} \cong L_1 \cdot \frac{\Delta I}{t_{off}} \quad (11)$$

From expressions (9) to (11) above, Ia is given by:

$$I_a \cong \frac{V_{ref1}}{R_{is}} \cdot \frac{V_{in} - V_{fd1}}{V_{in} - V_a} \quad (12)$$

An output current Ib when Vout droops and reaches zero is calculated by expression (12) above. In expression (12), when Va is asymptotically decreased to zero, we have:

$$I_b \cong \lim_{V_a \to 0} I_a \cong \lim_{V_a \to 0} \left( \frac{V_{ref1}}{R_{is}} \cdot \frac{V_{in} - V_{fd1}}{V_{in} - V_a} \right) \cong \frac{V_{ref1}}{R_{is}} \cdot \frac{V_{in} - V_{fd1}}{V_{in}} \quad (13)$$

At this time, assuming that Vin>Vfd1, and Vin>Va, we have:

$$V_{in} > V_{fd1} \text{ and } V_{in} > V_a \Rightarrow \frac{V_{ref1}}{R_{is}} \cdot \frac{V_{in} - V_{fd1}}{V_{in} - V_a} > \frac{V_{ref1}}{R_{is}} \cdot \frac{V_{in} - V_{fd1}}{V_{in}} \quad (14)$$

Hence, the drooping start current Ia when the output voltage Vout begins to droop, and the output current Ib when the output voltage Vout reaches zero meet:

$$I_a > I_b \quad (15)$$

That is, the drooping characteristics associated with the output voltage Vout become [/(slash)] type characteristics, as shown in FIG. 8A. When the drooping characteristics become [/(slash)] type characteristics, the reliability of the FET1 and diode D1 can be maintained, and depletion due to an overload can also be suppressed. This effect is expected since a current flowing through the FET1 and diode D1 at the time of, for example, short-circuiting of a load is reduced compared to that at the beginning of drooping.

[Second Embodiment]

Figure 9:
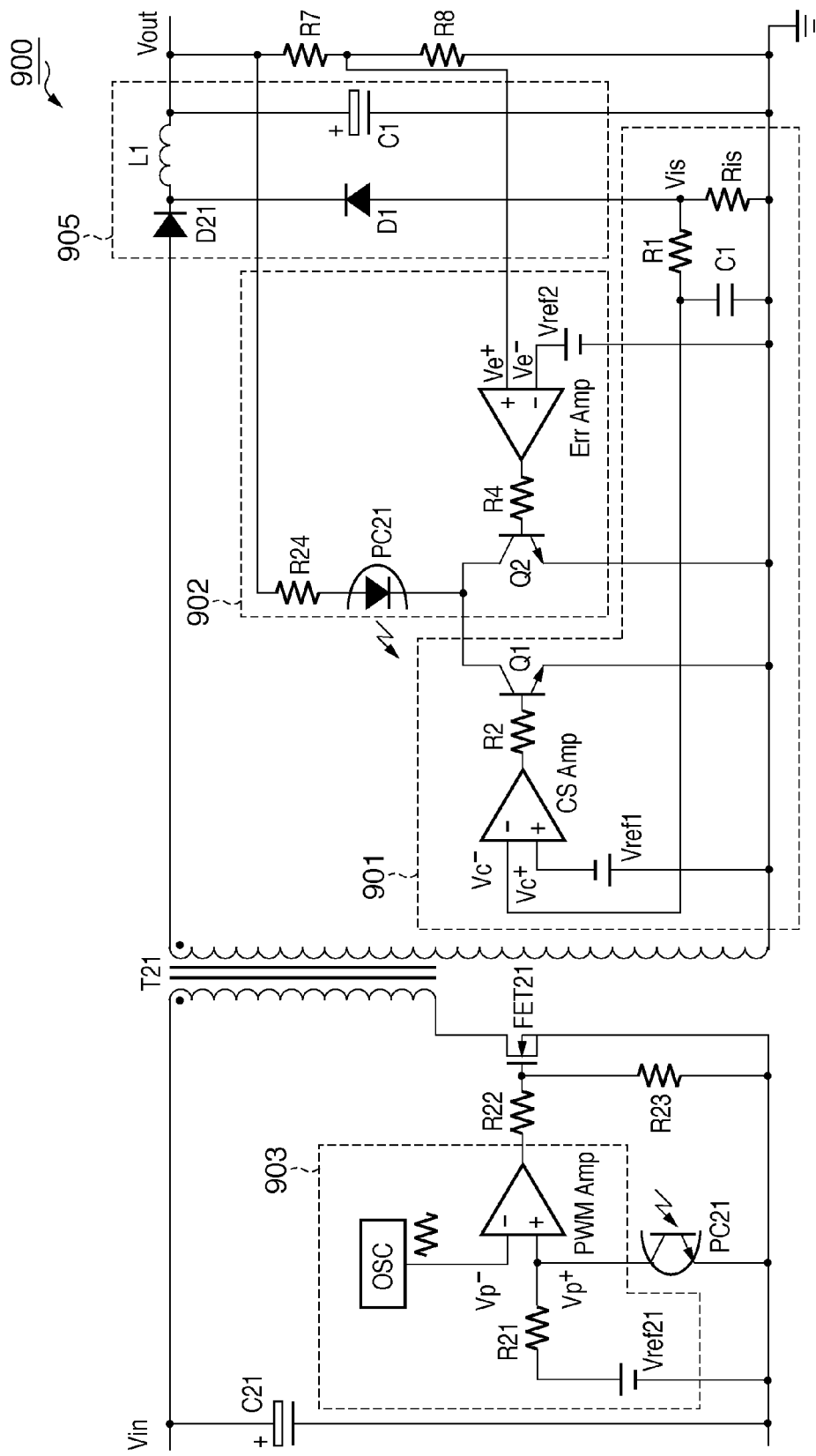
FIG. 9 is a circuit diagram showing a switching power supply device according to the second embodiment.

FIG. 9 is a circuit diagram showing a switching power supply device of the second embodiment. A DC/DC converter 900 is a forward isolation type DC/DC converter. The DC/DC converter 900 is characterized in that overload protection is performed by detecting a current flowing through a diode D1 for a circulate current. Note that the following description will be simplified by denoting parts common to the first embodiment by the same reference numerals.

Referring to FIG. 9, an FET21 as a switching element is connected to a primary coil of a transformer T21. To a secondary coil of the transformer T21, the other terminal of a diode D21 serving as a second rectifying element is connected. One terminal of the diode D21 is connected to an inductor L1. The DC/DC converter 900 is an isolation type DC/DC converter which circulates a current flowing through the inductor L1 when the switching element is disabled by the diode D1.

An AC voltage of a commercial power supply (not shown) supplied to the DC/DC converter 900 is rectified and smoothed by a diode bridge (not shown) and a primary electrolytic capacitor C21 to obtain a DC input voltage Vin. The input voltage Vin is supplied to the FET21 serving as the switching element via the primary coil of the transformer T21. To the gate terminal of the FET21, a PWM circuit 903 is connected via a resistor R22. The PWM circuit 903 is a pulse-width modulation circuit which outputs a pulse-width modulation signal used to change the ON duty of the switching element according to an output from an error amplifier. The PWM circuit 903 includes a resistor R21, constant-voltage power supply Vref21, comparator PWM Amp, and triangular wave generator OSC. To a non-inverting input terminal Vp+ of the comparator PWM Amp, an error amplifier 902 which amplifies an error is connected via a photocoupler PC21. The error amplifier 902 includes a resistor R24, transistor Q2, comparator Err Amp, and constant-voltage power supply Vref2. Note that a control circuit includes the error amplifier 902, PWM circuit 903, and photocoupler PC21 used to transfer an error.

When the FET21 performs switching, a pulse voltage is induced in the secondary coil of the transformer T21. This pulse voltage is converted into a DC voltage by a rectifying circuit 905 configured by the diodes D1 and D21, the inductor L1, and an electrolytic capacitor C1, thus obtaining an output voltage Vout. The output voltage Vout is voltage-divided by resistors R7 and R8, and is supplied to a non-inverting input terminal Ve+ of the comparator Err Amp. On the other hand, a reference voltage Vref2 from the constant-voltage power supply Vref2 is supplied to an inverting input terminal Ve− of the comparator Err Amp. The comparator Err Amp increases/decreases the base current of the transistor Q2 based on error information of the output voltage Vout, thereby controlling the non-inverting input terminal voltage Vp+ of the comparator PWM Amp. The FET21 performs PWM switching based on error information of the output voltage Vout, so that the output voltage Vout is converted into a constant voltage.

An overload protection circuit 901 is configured by the resistors Ris, R1, and R2, capacitor C1, constant-voltage power supply Vref1, comparator CS Amp, and transistor Q1 as in the overload protection circuit 501 of the first embodiment. Therefore, the operation of this overload protection circuit 901 is the same as that of the overload protection circuit 501.

Figure 10:
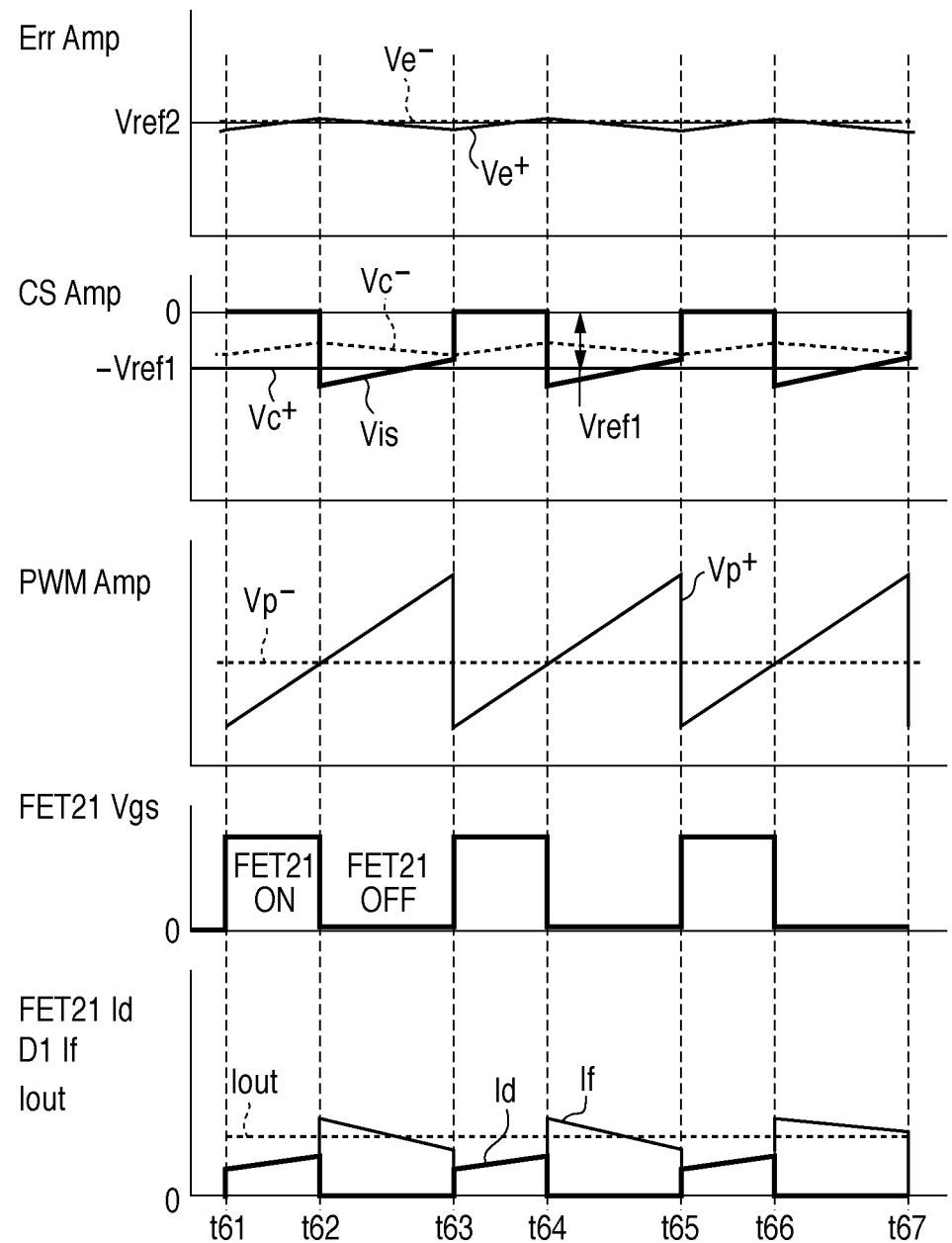
FIG. 10 is a chart showing an operation example when an output current Iout assumes a normal value.

As shown in FIG. 10, when an output current Iout assumes a normal value, an inverting input terminal voltage Vc− and non-inverting input terminal Vc+ of the comparator CS Amp meet Vc−>Vc+. Hence, the comparator CS Amp disables the transistor Q1. Therefore, the comparator CS Amp does not influence the operation of the PWM circuit.

Figure 11B:
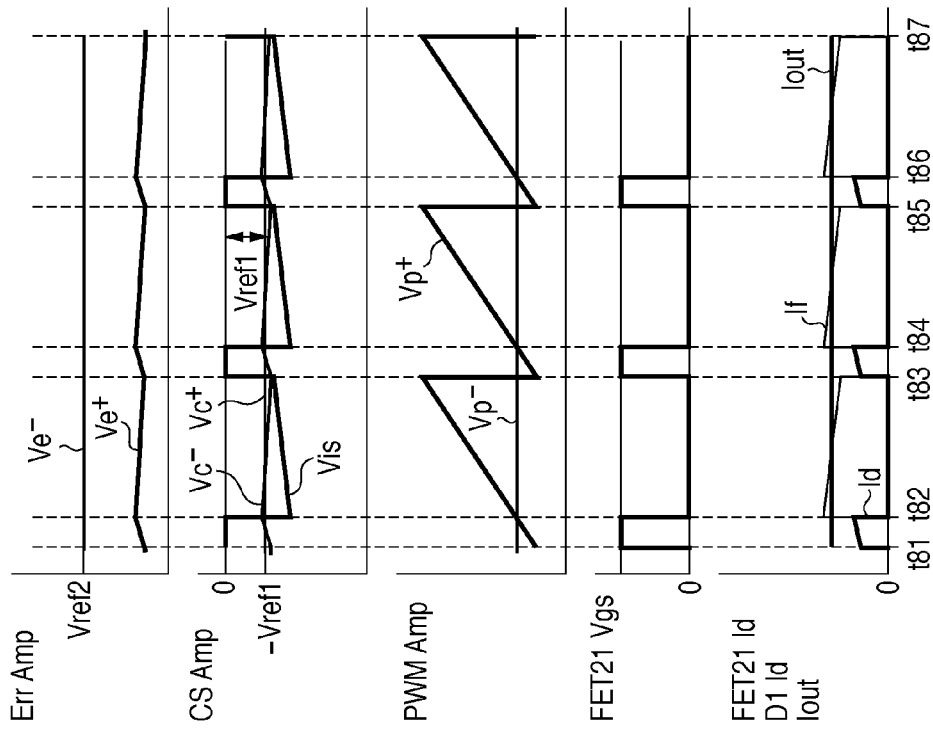
FIGS. 11A and 11B are charts showing the operation of the DC/DC converter when an output current Iout assumes an excessive value (overload state)
Figure 11A:
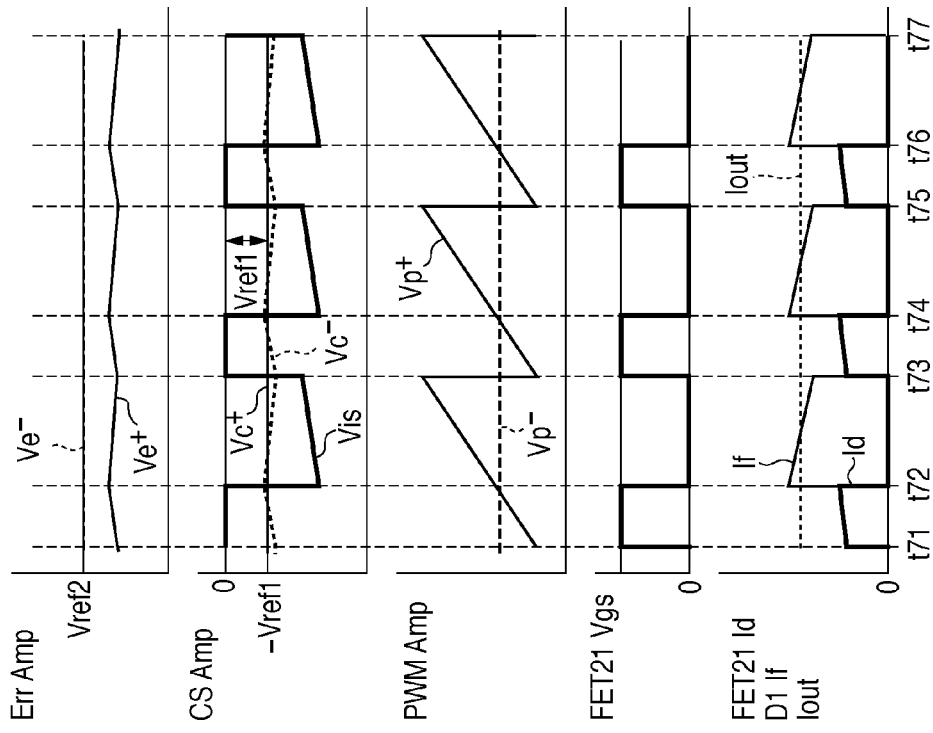

On the other hand, as shown in FIG. 11A, when the output current Iout assumes an excessive value, the peak value of a forward current If rises. Hence, the amplitude of Vis increases. Then, the inverting input terminal voltage Vc− of the comparator CS Amp becomes slightly lower than the non-inverting input terminal voltage Vc+ (=−Vref1). The comparator CS Amp increases the base current of the transistor Q1, and reduces a non-inverting input terminal voltage Vp+ of a comparator PWM Amp. As a result, the ON duty of the FET21 is reduced. The output voltage Vout is reduced due to the reduction of the ON duty of the FET21. When the ON duty of the FET21 is reduced, the conduction duty of D1 increases conversely, and the pulse width of Vis also increases. Hence, the inverting input terminal voltage Vc− of the comparator CS Amp is further reduced. Then, as shown in FIG. 11B, the comparator CS Amp further increases the base current of the transistor Q1, and reduces the non-inverting input terminal voltage Vp+ of the comparator PWM Amp. In response to this, the comparator PWM Amp further reduces the ON duty of the FET21. That is, the control enters the following positive feedback loop:

[reduction of ON duty of FET21→increase in conduction duty of D1→reduction of inverting input terminal voltage Vc− of CS Amp→reduction of ON duty of FET21→ . . .]

In this way, in the second embodiment, as in the first embodiment, the drooping characteristics of the output voltage Vout become [/(slash)] type characteristics. Hence, for example, even when short-circuiting of a load has occurred, since a current flowing through the FET21 and the diodes D1 and D21 is reduced by the overload protection circuit 901 compared to that at the beginning of drooping, the reliability of these devices can be maintained, and these devices can be protected from being depleted.

[Third Embodiment]

Figure 12:
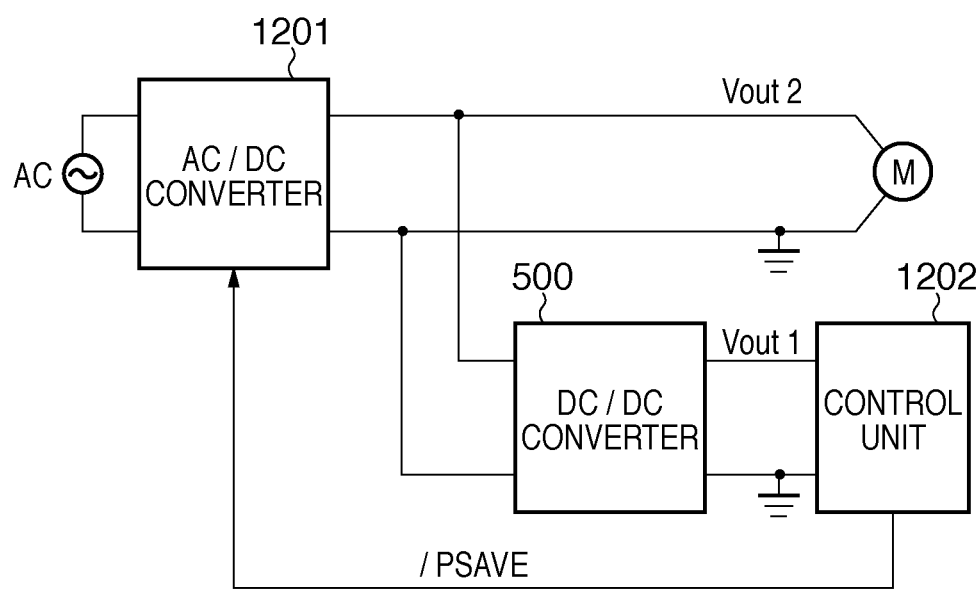
FIG. 12 is a block diagram showing a power supply device and a device serving as a load according to the third embodiment.
Figure 13:
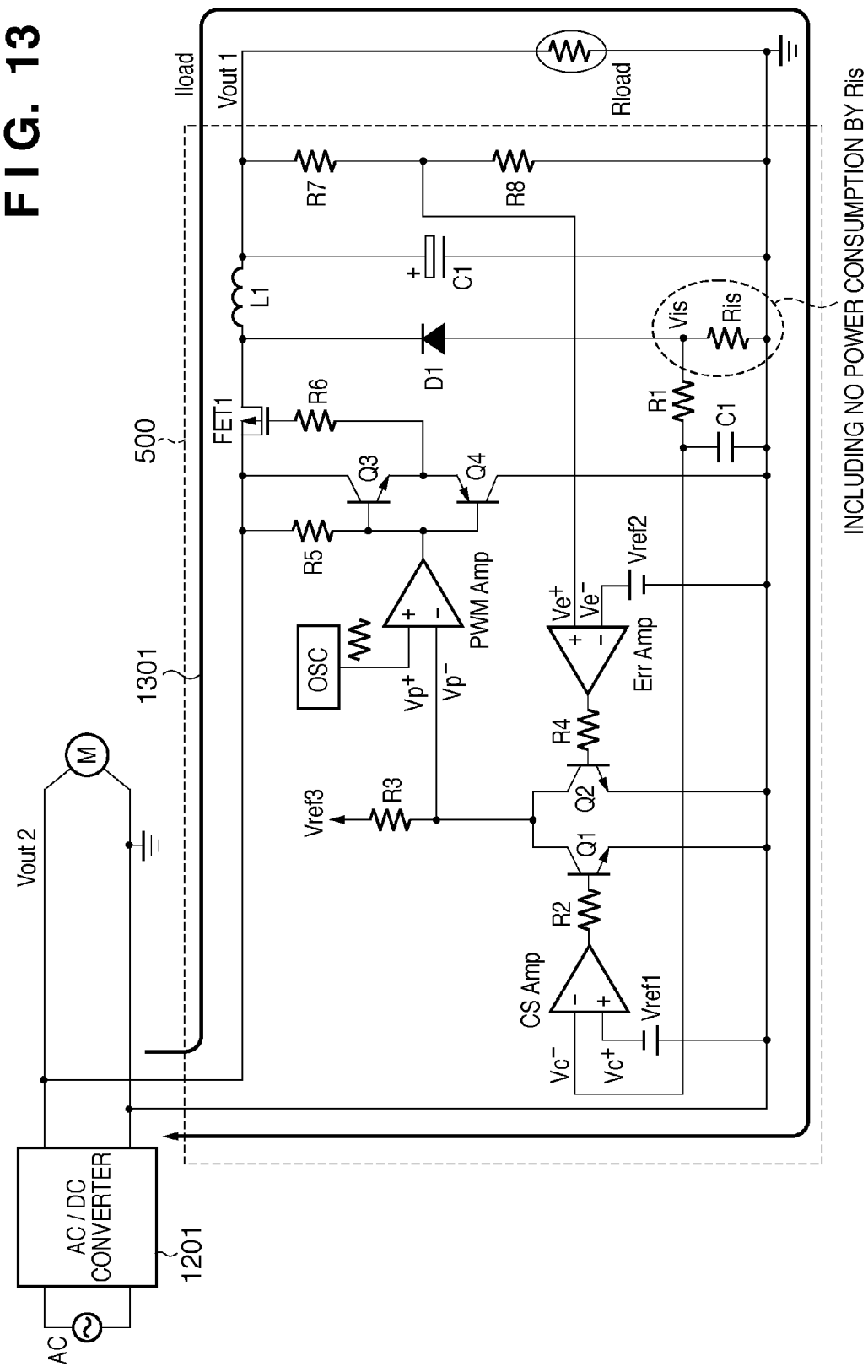
FIG. 13 is a block diagram showing a power supply device and a device serving as a load according to the third embodiment.

The third embodiment will explain a power supply system configured by arranging the DC/DC converter 500 described in the first embodiment after the isolation type DC/DC converter 900. FIGS. 12 and 13 are block diagrams showing a power supply device and a device serving as a load according to the third embodiment. An AC/DC converter 1201 is a first converter which transforms and outputs an input voltage. The DC/DC converter 500 is a second converter which further transforms the output voltage of the AC/DC converter 1201 to obtain a second output voltage. A control unit 1202 serves as a switching circuit which switches the output voltage of the first converter to one of a high voltage and low voltage in accordance with a state of an electronic device to which the second output voltage is supplied.

The AC/DC converter 1201 includes the isolation type DC/DC converter 900, and transforms an AC voltage of a commercial power supply AC into a DC voltage Vout2. The DC output voltage Vout2 is supplied to an actuator M such as a motor. On the other hand, the DC output voltage Vout2 is also supplied to the DC/DC converter 500. The DC/DC converter 500 transforms the DC voltage Vout2 as an input voltage Vin into a DC output voltage Vout1. The output voltage Vout1 is supplied to the control unit 1202 which controls the device. In general, a power supply voltage of the actuator M is set to be higher than that of the control unit 1202. The output voltage Vout1 of the DC/DC converter 500 is controlled to be Va, as described in the first embodiment. On the other hand, the output voltage Vout2 of the AC/DC converter 1201 is set to be higher than Va.

Nowadays, originating from environmental issues, reduction of the standby powers of electronic devices is strongly demanded. Assume that the device to be described in this embodiment has a normal mode and power save mode, and the operation state of a switching power supply is changed to reduce the standby power in the power save mode.

In FIG. 12, a power save signal /PSAVE is supplied from the control unit 1202 to the AC/DC converter 1201. The control unit 1202 shifts the device to the power save mode using the signal /PSAVE. For example, when the control unit 1202 sets the device in the normal mode, it sets the signal /PSAVE at H level. When the control unit 1202 sets the device in the power save mode, it sets the signal /PSAVE at L level. In the normal mode, the output voltage Vout1 of the DC/DC converter 500 is Va. The output voltage Vout2 of the AC/DC converter 1201 is set to be higher than Va. Therefore, the DC/DC converter performs a switching operation, as described in the first embodiment.

In the power save mode, the control unit 1202 sets the output voltage Vout2 to be lower than Va and to fall within a power supply voltage range in which the control unit 1202 is operable by changing the operation of the AC/DC converter 1201. Then, switching of the DC/DC converter 500 is stopped to set an FET1 in a normally ON state. Hence, a switching loss consumed by the FET1 becomes zero, thus reducing the standby power of the device.

An output current Iload of the DC/DC converter 500 in the power save mode is looped via a route indicated by an arrow 1301 in FIG. 13. It should be noted that no current detection resistor Ris is included in the loop of the output current Iload. Hence, no power is consumed by the resistor Ris.

Figure 14:
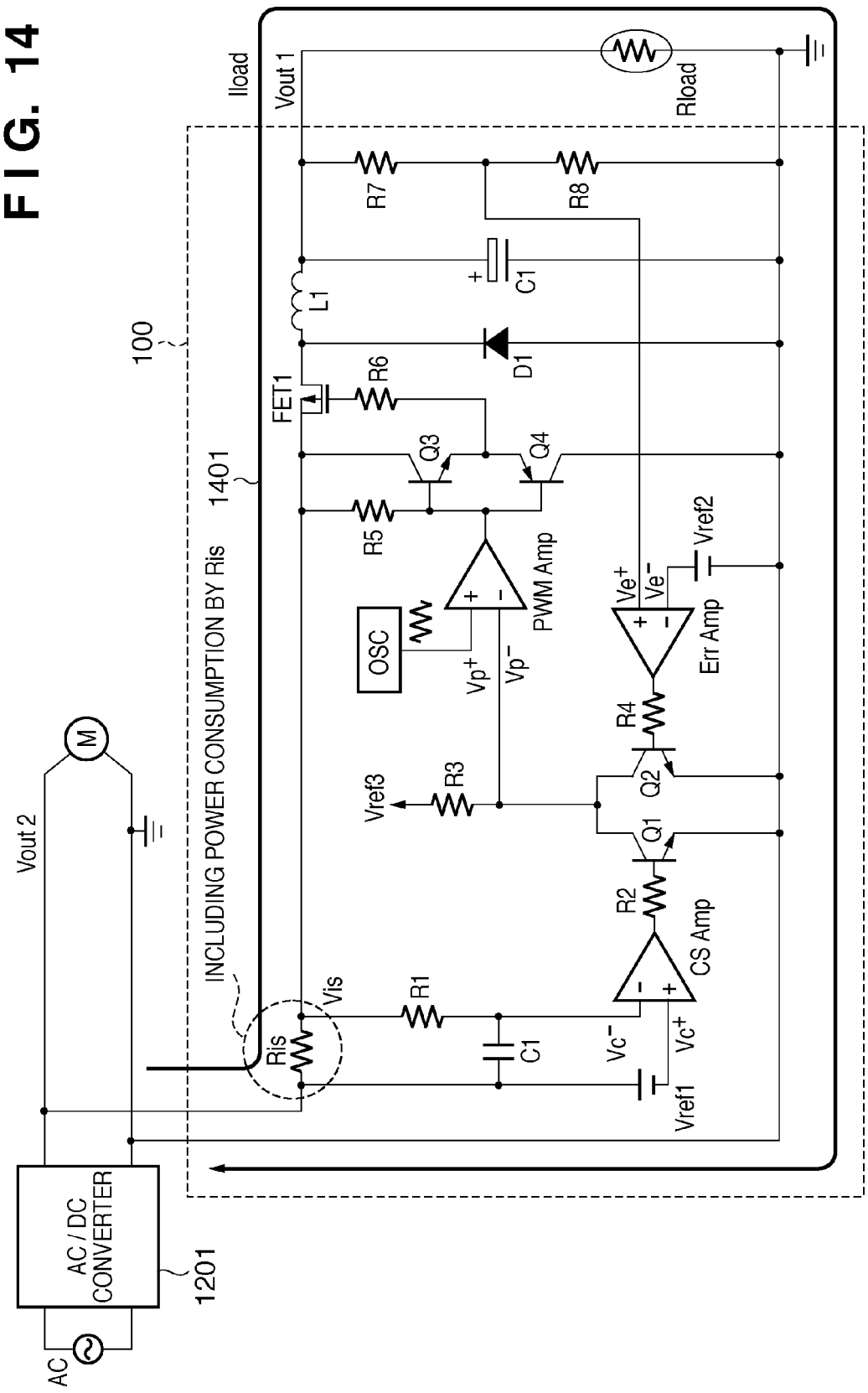
FIG. 14 is a circuit diagram showing a comparative example.

On the other hand, FIG. 14 is a circuit diagram showing a comparative example in which the DC/DC converter 500 is replaced by the DC/DC converter 100 shown in FIG. 1. In the arrangement shown in FIG. 14, the current detection resistor Ris is included in a loop 1401 of the output current Iload. Hence, wasteful power is consumed by the current detection resistor Ris.

In this way, the DC/DC converter 500 described in the first embodiment is also excellent in terms of power consumption. That is, since the FET1 of the DC/DC converter 500 is set in a normally ON state after transition to the power save mode, wasteful power consumption can be suppressed in the power save mode in the electronic device which requires reducing the standby power.

<Application Example of Switching Power Supply>

The switching power supply of the first to third embodiments described above can be applied as a low-voltage power supply in an image forming apparatus such as a printer, copying machine, and facsimile. Also, the switching power supply can be applied as a power supply required to supply an electric power to a controller as a control unit in an image forming apparatus and that required to supply an electric power to a motor as a driving unit of convey rollers used to convey paper sheets.

Figure 15A:
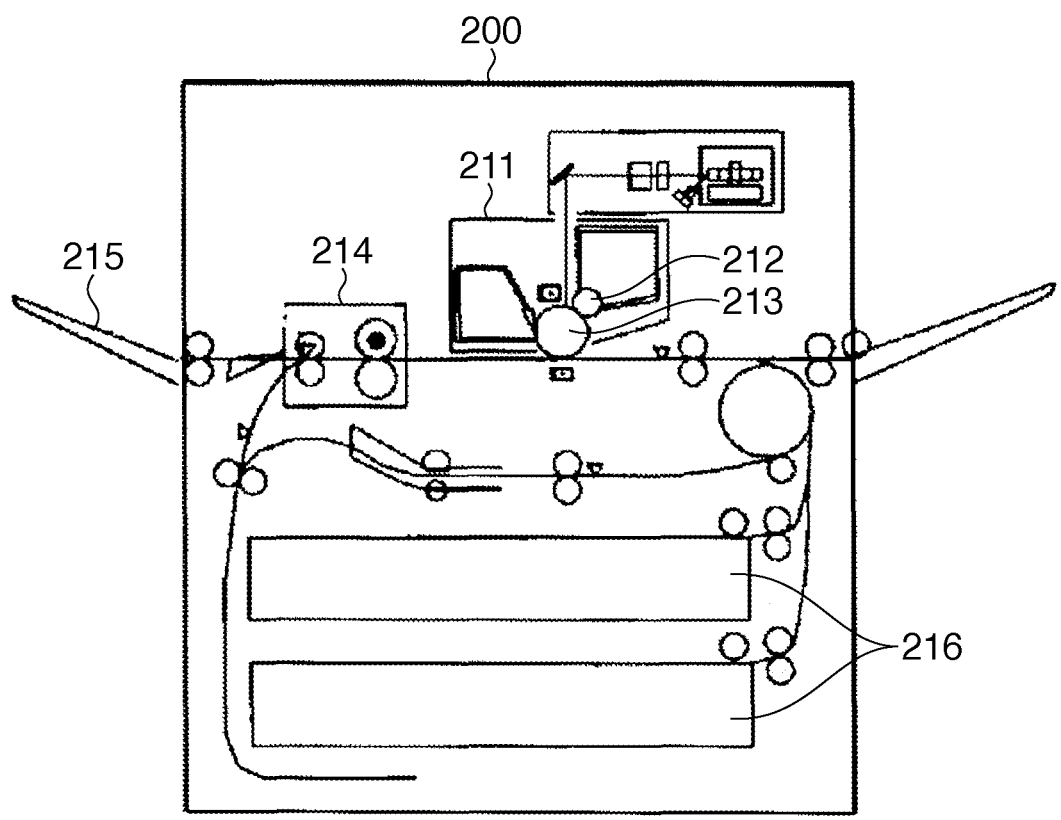
FIG. 15A is a view showing an image forming apparatus including a switching power supply device.
Figure 15B:
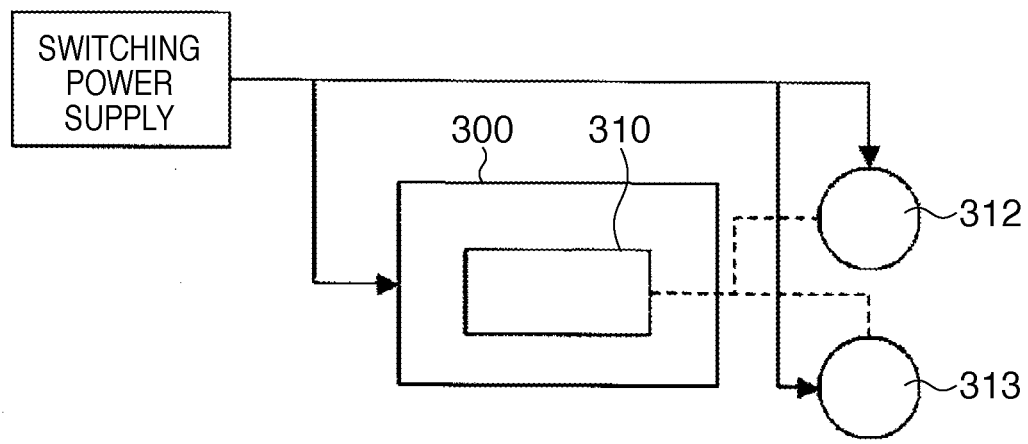
FIG. 15B is a block diagram showing an application example of a switching power supply device.

FIG. 15A shows a schematic structure of a laser beam printer as an example of the image forming apparatus. A laser beam printer 200 includes, as an image forming unit 211, a photosensitive drum 213 as an image carrier on which a latent image is formed, and a developing unit 212 which develops the latent image formed on the photosensitive drum with toner. A toner image developed on the photosensitive drum 213 is transferred onto a sheet (not shown) as a print medium supplied from one of cassettes 216, and the toner image transferred on the sheet is fixed by a fixing device 214, thus exhausting the sheet onto a tray 215. FIG. 15B shows a power supply arrangement from a power supply to the controller as the control unit of the image forming apparatus and to motors as the driving unit. The switching power supply is applied as a low-voltage power supply which supplies an electric power to a controller 300 having a CPU 310 which controls the image forming operation of the image forming apparatus, and also to motors 312 and 313 as the driving unit required to form an image. As examples of voltages to be supplied, a voltage of 3.3 V is supplied to the controller 300, and that of 24 V is supplied to the motors. For example, the motor 312 corresponds to a motor for driving rollers used to convey a sheet, and the motor 313 corresponds to a motor for driving the fixing device 214.

In this arrangement, assume that, for example, the motor of the image forming apparatus reaches an overload state. As described in the aforementioned first and second embodiments, the drooping characteristics of the output voltage Vout of the switching power supply become [/(slash)] type characteristics. Hence, a current flowing through the FET and diode is reduced by an overload protection circuit to be lower than that at the beginning of drooping. As a result, the reliability of devices which configure a power supply circuit can be maintained, and these devices can be protected from being depleted. In a standby state in which the image forming apparatus does not execute any image forming operation, the image forming apparatus may be shifted to an energy saving mode (a power save mode of a power supply). In the energy saving mode, the switching power supply reduces the output voltage to shift to a light load state, thus suppressing wasteful power consumption in the energy saving mode, as described in the third embodiment. Note that the arrangement of the switching power supply is applicable as a low-voltage power supply of other electronic devices in addition to the image forming apparatus described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-026997, filed Feb. 9, 2010 and No. 2011-004367, filed Jan. 12, 2011, which are hereby incorporated by reference herein in their entirety.

What is claimed is:

1. A switching power supply device which comprises:
a switching element configured to switch an input voltage;
a rectifying circuit including an inductor and a first rectifying element which are connected to the switching element, and configured to rectify the voltage switched by the switching element;
a control circuit configured to control a switching state of the switching element such that a voltage rectified by the rectifying circuit is close to a predetermined target value in accordance with the output of the rectifying circuit;
an overload protection circuit connected to the inductor and the first rectifying element, wherein the overload protection circuit is configured to convert a current flowing through the first rectifying element into a voltage and output the converted voltage, and is further configured to reduce an on-time of the switching element to reduce an output from the rectifying circuit;
a detection circuit constructed to detect a value corresponding to a current flowing through the first rectifying element; and
an averaging unit constructed to average the detection result of said detection circuit,
wherein the value corresponding to the current detected by the detection circuit is an output of said averaging unit,
wherein a first terminal of the inductor and a first terminal of the first rectifying element are connected to a first terminal of the switching element,
wherein a first output terminal used to connect a load and a first terminal of a capacitor are connected to a second terminal of the inductor,
wherein a first terminal of a detection resistor serving as said detection circuit is connected to a second terminal of the first rectifying element,
wherein a second terminal of the capacitor and a second terminal used to connect a load are connected to a second terminal of the detection resistor,
wherein said averaging unit comprises an averaging resistor and an averaging capacitor,
wherein the second terminal of the first rectifying element and a first terminal of the detection resistor are connected to a first terminal of the averaging resistor, and
wherein a second terminal of the averaging resistor is connected to a first terminal of the averaging capacitor, and the second terminal of the detection resistor is connected to a second terminal of the capacitor.

2. The device according to claim 1, wherein said switching power supply device is an isolation type DC/DC converter which comprises a transformer, a primary coil of which is connected to the switching element, and a secondary coil of which is connected to the other terminal of a second rectifying element, one terminal of which is connected to the inductor, and when the switching element is disabled by the first rectifying element, the isolation type DC/DC converter circulates a current which flows through the inductor.

3. The switching power supply device according to claim 1, wherein the control circuit includes a feedback circuit which controls the turn-on time of the switching element by feeding back the output of the rectifying circuit, and the overload protection circuit controls operation of the feedback circuit.

4. A power supply system comprising:
a first converter which transforms and outputs an input voltage;
a second converter which further transforms an output voltage of the first converter to obtain a second output voltage; and
a switching circuit which switches the output voltage of the first converter to one of a high voltage and a low voltage in accordance with a state of an electronic device to which the second output voltage is supplied,
wherein a switching power supply device according to claim 1 is adopted as the second converter.

5. A switching power supply device which comprises:
a switching element configured to switch an input voltage;
a rectifying circuit including an inductor and a first rectifying element which are connected to the switching element, and configured to rectify the voltage switched by the switching element;
a control circuit configured to control a switching state of the switching element such that a voltage rectified by the rectifying circuit is close to a predetermined target value in accordance with the output of the rectifying circuit;
an overload protection circuit connected to the inductor and the first rectifying element, wherein the overload protection circuit is configured to convert a current flowing through the first rectifying element into a voltage and output the converted voltage, and is further configured to reduce an on-time of the switching element to reduce an output from the rectifying circuit,
wherein the control circuit comprises:
an error amplifier configured to amplify an error;
a pulse-width modulation circuit configured to output a pulse-width modulation signal required to change an ON duty of the switching element in accordance with an output from the error amplifier; and
a push-pull circuit configured to perform a push-pull operation in accordance with the pulse-width modulation signal from the pulse-width modulation circuit,
wherein the overload, protection circuit is configured to control operation of the error amplifier.

6. An image forming apparatus comprising:
an image forming unit which forms an image on a printing material;
a control unit which controls an operation of said image forming unit; and
a switching power supply which supplies an electric power to said control unit,
said switching power supply comprising:
a switching element configured to switch an input voltage;
a rectifying circuit including an inductor and a first rectifying element which are connected to the switching element, and configured to rectify the voltage switched by the switching element;
a control circuit configured to control a switching state of the switching element such that a voltage rectified by the rectifying circuit is close to a predetermined target value in accordance with the output of the rectifying circuit;
an overload protection circuit connected to the inductor and the first rectifying element, wherein the overload protection circuit is configured to convert a current flowing through the first rectifying element into a voltage and output the converted voltage, and is further configured to reduce an on-time of the switching element to reduce an output from the rectifying circuit;
a detection circuit constructed to detect a value corresponding to a current flowing through the first rectifying element; and
an averaging unit constructed to average the detection result of said detection circuit,
wherein the value corresponding to the current detected by the detection circuit is an output of said averaging unit,
wherein a first terminal of the inductor and a first terminal of the first rectifying element are connected to a first terminal of the switching element,
wherein a first output terminal used to connect a load and a first terminal of a capacitor are connected to a second terminal of the inductor,
wherein a first terminal of a detection resistor serving as said detection circuit is connected to a second terminal of the first rectifying element,
wherein a second terminal of the capacitor and a second terminal used to connect a load are connected to a second terminal of the detection resistor,
wherein said averaging unit comprises an averaging resistor and an averaging capacitor,
wherein the second terminal of the first rectifying element and a first terminal of the detection resistor are connected to a first terminal of the averaging resistor, and
wherein a second terminal of the averaging resistor is connected to a first terminal of the averaging capacitor, and the second terminal of the detection resistor is connected to a second terminal of the capacitor.

7. The image forming apparatus according to claim 6, further comprising:
a drive unit which drives the image forming unit,
wherein the switching power supply is further configured to supply power to the driving unit.

8. The image forming apparatus according to claim 7,
wherein the driving unit comprises a motor, and the output reduction unit works as the overload protection circuit configured to protect the switching element from an overload state where an amount of current that flows across the motor applied with the output of the rectifying circuit is a predetermined amount or more.

9. A switching power supply device comprising:
a switching element;
a rectifying circuit which rectifies an output of the switching element;
a control circuit which controls an output of the rectifying circuit by changing a switching state of the switching element in accordance with the output of the rectifying circuit and a predetermined target value;
an overload protection circuit which is connected to the rectifying circuit, which converts a current output from the rectifying circuit into a voltage and which outputs the converted voltage via a filter circuit;
a detection circuit which detects a value corresponding to a current flowing through the rectifying circuit; and
an averaging unit which averages the detection result of said detection circuit,
wherein said rectifying circuit comprises an inductor and a first rectifying element,
wherein a first terminal of the inductor and a first terminal of the first rectifying element are connected to a first terminal of the switching element,
wherein a first output terminal used to connect a load and a first terminal of a capacitor are connected to a second terminal of the inductor,
wherein a first terminal of a detection resistor serving as said detection circuit is connected to a second terminal of the first rectifying element,
wherein a second terminal of the capacitor and a second terminal used to connect a load are connected to a second terminal of the detection resistor,
wherein said averaging unit comprises an averaging resistor and an averaging capacitor,
wherein the second terminal of the first rectifying element and a first terminal of the detection resistor are connected to a first terminal of the averaging resistor,
wherein a second terminal of the averaging resistor is connected to a first terminal of the averaging capacitor, and the second terminal of the detection resistor is connected to a second terminal of the capacitor, and
wherein the control circuit reduces the current output from the rectifying circuit in response to reduction of an output from the overload protection circuit by controlling operation of the switching element in response to an output from the overload protection circuit in a case where the current is output from said rectifying circuit.

10. A switching power supply device which comprising:
a switching element;
a rectifying circuit which rectifies an output of the switching element;
a control circuit which controls an output of the rectifying circuit by changing a switching state of the switching element in accordance with the output of the rectifying circuit and a predetermined target value; and
an overload protection circuit which is connected to the rectifying circuit, which converts a current output from the rectifying circuit into a voltage and which outputs the converted voltage via a filter circuit, wherein the control circuit reduces the current output from the rectifying circuit in response to reduction of an output from the overload protection circuit by controlling operation of the switching element in response to an output from the overload protection circuit in a case where the current is output from said rectifying circuit, wherein the control circuit includes an error amplifier which amplifies an error, a pulse-width modulation circuit which outputs a pulse-width modulation signal required to change an ON duty of the switching element in accordance with an output from the error amplifier, and a push-pull circuit which performs a push-pull operation in accordance with the pulse-width modulation signal from the pulse-width modulation circuit, and wherein the overload protection circuit controls operation of the error amplifier.

11. A power supply system comprising:
a first converter which transforms and outputs an input voltage;
a second converter which further transforms an output voltage of the first converter to obtain a second output voltage; and
a switching circuit which switches the output voltage of the first converter to one of a high voltage and a low voltage in accordance with a state of an electronic device to which the second output voltage is supplied,
wherein a switching power supply device is adopted as the second converter, the switching power supply device comprising:
a switching element configured to switch an input voltage;
a rectifying circuit including an inductor and a first rectifying element which are connected to the switching element, and configured to rectify the voltage switched by the switching element;
a control circuit configured to control a switching state of the switching element such that a voltage rectified by the rectifying circuit is close to a predetermined target value in accordance with the output of the rectifying circuit;
an overload protection circuit connected to the inductor and the first rectifying element, wherein the overload protection circuit is configured to convert a current flowing through the first rectifying element into a voltage and output the converted voltage, and is further configured to reduce an on-time of the switching element to reduce an output from the rectifying circuit;

wherein the control circuit comprises:
an error amplifier configured to amplify an error;
a pulse-width modulation circuit configured to output a pulse-width modulation signal required to change an ON duty of the switching element in accordance with an output from the error amplifier; and
a push-pull circuit configured to perform a push-pull operation in accordance with the pulse-width modulation signal from the pulse-width modulation circuit,
wherein the overload protection circuit is configured to control operation of the error amplifier.

12. An image forming apparatus comprising:
an image forming unit which forms an image on a printing material;
a control unit which controls an operation of said image forming unit; and
a switching power supply which supplies an electric power to said control unit,
said switching power supply comprising:
a switching element configured to switch an input voltage;
a rectifying circuit including an inductor and a first rectifying element which are connected to the switching element, and configured to rectify the voltage switched by the switching element;
a control circuit configured to control a switching state of the switching element such that a voltage rectified by the rectifying circuit is close to a predetermined target value in accordance with the output of the rectifying circuit; and
an overload protection circuit connected to the inductor and the first rectifying element, wherein the overload protection circuit is configured to convert a current flowing through the first rectifying element into a voltage and output the converted voltage, and is further configured to reduce an on-time of the switching element to reduce an output from the rectifying circuit,
wherein the control circuit comprises:
an error amplifier configured to amplify an error;
a pulse-width modulation circuit configured to output a pulse-width modulation signal required to change an ON duty of the switching element in accordance with an output from the error amplifier; and
a push-pull circuit configured to perform a push-pull operation in accordance with the pulse-width modulation signal from the pulse-width modulation circuit,
wherein the overload protection circuit is configured to control operation of the error amplifier.

\* \* \* \* \*